(12) United States Patent
Szwaykowski

(10) Patent No.: US 8,269,980 B1
(45) Date of Patent: Sep. 18, 2012

(54) WHITE LIGHT SCANNING INTERFEROMETER WITH SIMULTANEOUS PHASE-SHIFTING MODULE

(75) Inventor: Piotr Szwaykowski, Tucson, AZ (US)

(73) Assignee: Engineering Synthesis Design, Inc., Tucson, AZ (US)

( * ) Notice: Subject to any disclaimer, the term of this patent is extended or adjusted under 35 U.S.C. 154(b) by 222 days.

(21) Appl. No.: 12/778,009

(22) Filed: May 11, 2010

Related U.S. Application Data

(60) Provisional application No. 61/215,988, filed on May 11, 2009.

(51) Int. Cl.
*G01B 11/02* (2006.01)

(52) U.S. Cl. .................................................. 356/504

(58) Field of Classification Search ................. None
See application file for complete search history.

(56) References Cited

U.S. PATENT DOCUMENTS

| | | |
|---|---|---|
| 3,950,103 A | 4/1976 | Schmidt-Weinmar |
| 3,958,884 A | 5/1976 | Smith ........................... 356/495 |
| 4,583,855 A | 4/1986 | Bareket ........................ 356/521 |
| 4,597,665 A | 7/1986 | Galbraith et al. ........... 356/239.8 |
| 4,710,642 A | 12/1987 | McNeil .................... 250/559.04 |
| 4,732,483 A | 3/1988 | Biegen .......................... 356/495 |
| 4,776,101 A | 10/1988 | Ishibai ............................. 33/351 |
| 4,872,755 A | 10/1989 | Kuchel ........................... 356/495 |
| 5,241,369 A | 8/1993 | McNeil et al. ................. 356/445 |
| 5,313,542 A | 5/1994 | Castonguay |
| 5,475,617 A | 12/1995 | Castonguay |
| 5,491,552 A | 2/1996 | Knuttel .......................... 356/495 |
| 5,615,294 A | 3/1997 | Castonguay |
| 5,625,451 A | 4/1997 | Schiff et al. ................... 356/236 |
| 5,640,246 A | 6/1997 | Castonguay |
| 5,729,640 A | 3/1998 | Castonguay |
| 5,737,079 A | 4/1998 | Burge et al. .................... 356/348 |
| 5,774,224 A | 6/1998 | Kerstens ........................ 356/394 |
| 5,835,217 A | 11/1998 | Medecki ........................ 356/521 |
| 5,995,223 A | 11/1999 | Power ............................ 356/495 |
| 6,034,776 A | 3/2000 | Germer et al. ................ 356/369 |
| 6,118,521 A | 9/2000 | Jung et al. ........................ 356/73 |
| 6,122,047 A | 9/2000 | Stover et al. ................ 356/237.3 |

(Continued)

FOREIGN PATENT DOCUMENTS

DE             19652113          6/1998

(Continued)

OTHER PUBLICATIONS

Hettwer et al. "Three channel phase-shifting interferometers using polarization-optics and a diffraction granting", Optical Engineering, Sep. 21, 1999, pp. 960-966, vol. 39.

(Continued)

*Primary Examiner* — Tu Nguyen

(74) *Attorney, Agent, or Firm* — Hayes Soloway P.C.

(57) ABSTRACT

A simultaneous phase-shifting white light scanning interferometer comprises a white light scanning interferometer, a simultaneous phase-shifting module, and a scanner. Light from a short coherence length light source may be polarized and then split, by a polarization type beam-splitter, into orthogonally polarized reference and test beams. The simultaneous phase-shifting module comprises a plurality of detectors, allows for controlled phase shifts between the reference and test beams, and creates at least three independent interferograms, each with different phase shifts between the reference and test beams. The scanner translates the simultaneous phase-shifting module with respect to an object under measurement.

5 Claims, 3 Drawing Sheets

U.S. PATENT DOCUMENTS

| | | | |
|---|---|---|---|
| 6,128,080 A | 10/2000 | Janik et al. | |
| 6,304,330 B1 | 10/2001 | Millerd et al. | 356/521 |
| 6,341,015 B2 | 1/2002 | Shirley | 356/517 |
| 6,456,382 B2 | 9/2002 | Ichihara et al. | 356/513 |
| 6,552,808 B2 | 4/2003 | Millerd et al. | 356/521 |
| 6,573,997 B1 | 6/2003 | Goldberg et al. | 356/521 |
| 6,578,963 B2 | 6/2003 | Pettit | 351/212 |
| 6,690,474 B1 | 2/2004 | Shirley | 356/603 |
| 7,256,895 B2 | 8/2007 | Castonguay | 256/511 |
| 7,561,279 B2 | 7/2009 | Castonguay et al. | 356/495 |
| 7,609,388 B2 * | 10/2009 | Arieli et al. | 356/512 |
| 7,649,634 B2 * | 1/2010 | Wan | 356/504 |
| 2002/0093648 A1 | 7/2002 | Nikoonahad et al. | 356/237.1 |
| 2003/0095264 A1 | 5/2003 | Ruchet | 356/491 |
| 2006/0146340 A1 | 7/2006 | Szwaykowski et al. | 356/495 |
| 2006/0228010 A1 | 10/2006 | Rubbert et al. | 382/128 |
| 2007/0296979 A1 | 12/2007 | Morimoto et al. | 356/609 |

FOREIGN PATENT DOCUMENTS

| | | |
|---|---|---|
| WO | WO 2004/051182 | 6/2004 |

OTHER PUBLICATIONS

Koliopoulos, Chris L., "Simultaneous phase shift interferometer", Advanced Optical Manufacturing and Testing II, Jan. 1992, pp. 119-127, vol. 1531, Tucson, Arizona.

Sivakumar et al., "Large surface profile measurement with instantaneous phase-shifting interferometry", Optical Engineering, Jul. 14, 2002, pp. 367-372, vol. 442.

Schwider, "Single-frame realtime interferometer (SIFRI)", Aug. 21, 1998, pp. 1-3, http://www.optik.uni-erlangen.de/mikos/projects/sifri/sifri.htm.

Nakadate et al., "Real-Time Fringe Patter Processing and its Applications", Proc. of SPIE, vol. 2544, pp. 74-86, Jun. 1995 (Abstract only).

* cited by examiner

WHITE LIGHT SCANNING INTERFEROMETER WITH SIMULTANEOUS PHASE-SHIFTING MODULE

CROSS REFERENCE TO RELATED APPLICATION

This application claims priority from U.S. Provisional Application Ser. No. 61/215,988, filed May 11, 2009, the contents of which are incorporated herein by reference.

FIELD OF INVENTION

The present invention relates to interferometry, in particular, white light scanning interferometry involving the measuring of wavefronts through use of phase-shifted interferograms.

BACKGROUND OF INVENTION

Interferometers have been known and used for a long time. Interferometry is a widely used method for measuring surface profiles (often to nano-meter resolutions) and other physical properties of materials, gases and liquids. There are many types of interferometers, characterized by their optical designs and layouts. Some classical types are Twyman-Green, Fizeau, Michaelson, Mach-Zender, and Fabry-Perot. Each of these interferometer types produces interference patterns, called interferograms. These interferograms can be used to analyze characteristics of an object under test.

Interferograms are generated by the interference of a test wavefront and a reference wavefront. The test and reference wavefronts typically originate from a common source and are obtained by splitting the originating wavefront. The test wavefront then obtains information about the test object by interacting with the object under test (typically by reflecting off of, or transmitting through a test object). Similarly, the reference wavefront obtains its "reference" information by interacting with a "known" reference object, such as a super polished flat glass plate. Superimposing or interfering these two wavefronts (i.e. on a flat screen, or an image sensor such as a CCD) produces an interferogram.

Interferometers require coherent superposition of a "test beam" (of light) with a "reference beam" ("beam" and "wavefront" used interchangeably herein, with a "wavefront" being understood as propagating along the optical axis and sweeping out a volume that defines the light beam) resulting in the formation of an interferogram in the overlapping region of the two beams. This interferogram data can then be captured using various types of detectors, such as a camera, for analysis.

The spatial distribution of intensity levels within the interference pattern relates to differences in the phase of the test and reference wavefronts. Note that the reference wavefront is acted on by a known "measurement standard," such as an optical "reference" surface, and the test wavefront is acted on by the unknown object under test. Measuring the difference between the two wavefronts allows the test wavefront to be determined. In other words, the process is akin to comparing the "unknown" test wavefront to a "known" standard, the reference wavefront.

A single interferogram is usually insufficient to obtain the accuracy required for many applications. A variety of methods have been developed to acquire multiple phase-shifted interferograms as a means to increase accuracy and resolution of the measurement. Phase-shifting techniques require altering the phase between the two interfering wavefronts by introducing controlled phase delays between the test and reference beams. These added phase-shifts supply additional information that can be used to compute the test wavefront significantly more accurately. Almost all current techniques of phase shifting use sequential or "temporal" methods to introduce phase differences while multiple interferograms are acquired serially in time. However, in practice, these temporal methods cannot be used effectively in the presence of relatively fast changing environmental conditions (such as vibrations, air turbulences, etc), or when the object under test cannot be stabilized (i.e. vibrating), or when the object under test is in motion.

White light scanning interferometers ("WLSI") belong to a special group of optical measuring instruments that use the interference fringes of an interferogram created by a source with short coherence length. The interference fringes are formed from the interference of light reflected from a test object and a reference element, and the respective reflected lights are superimposed on an image of the object indicating location of those parts of the object's surface that are of the same distance to the reference. In this manner, a white light scanning interferometer can measure surface topography with very high accuracy, commonly exceeding 1 nm. The nature of the measurement requires that the object must be translated along the optical axis of the interferometer so that locations of all points on the surface of the object are compared with the reference.

The white light scanning interferometer is a well established measuring instrument. Interferometers based on this principle are most widely used in the inspection of parts in manufacturing, where they provide information about surface topography of the parts. White light scanning interferometry is a well-suited interferometry method for various reflecting and scattering surfaces, for different shapes and for different materials.

FIG. 1 shows a schematic diagram of a typical configuration of a white light scanning interferometer, as known in the prior art. The instrument includes three functional parts: measuring head 5, scanner 70 and base 80. The measuring head 5 includes light source 10 used to illuminate the measured object 30. The measuring head 5 further includes a beam splitter 20 that is a part of the interferometer system and is used to produce test and reference beams, a reference mirror 40, imaging optics 60, and an image detector 50. In this configuration, the beam splitter 20 is also used to combine light reflected by an object 30 and a reference mirror 40 so that the two beams leaving the beam splitter overlap and are directed towards image detector 50. Imaging optics 60 is used to create a sharp image of the reference mirror on the detector. Typically, a pixelated image detector such as a monochromatic CCD camera is used as the image detector 50 to capture the image and transfer it to a computer.

In operation, the white light scanning interferometer is used to measure topography of a top surface of the object 30. Light from the source 10 is split into a test and a reference beam in the beam splitter 20. They recombine after reflecting from the top surface of the object 30 and reference mirror 40 respectively. The imaging optics creates a sharp image of the reference mirror on the camera 50. In the process, those parts of the object 30 that are in focus for the current position of the scanner are also sharply imaged on the camera 50. The light from the test and reference beams interfere with each other creating a set of interference fringes superimposed on the image of the object 30 on the camera 50. These fringes form only for those parts of the object 30 for which the distance to the beam-splitter 20 differs from the distance between the beam-splitter 20 and the reference mirror 40 by no more than the coherence length of the source. Contrast (visibility) of the interference fringes varies as a function of the distance difference and is highest for those parts of the object for which the distance to the beam-splitter is equal to the distance between the beam-splitter and the reference mirror. Using contrast of the interference fringes as an indicator, the distance difference between measured surface and the reference mirror can be measured with accuracy better then 1 nm. Typically, a short coherence length of the illumination source is required (usually several micrometers) which can be adjusted to some degree by properly filtering light from the source.

For a given position of the measuring head only those parts of the object 30 can be measured for which interference fringes exist. Thus, in order to measure all points of the object the measuring head must be translated by a distance covering the entire range of heights for all the points creating the top surface of the object 30. In practice, by continuously scanning the optical head 5 with respect to the object 30, starting from the lowest point of the surface and continuing through the highest point on the surface, a complete profile of surface topography can be measured.

The scanning procedure, being an integral part of the measurement, is also a source of major limitations in white light interferometry. The sampling interval in scanning is limited by the period of the interference fringes and is usually fixed to a certain fraction of light wavelength. As a consequence, a large number of images are required for even moderate scans. This makes the measurement with a WLSI a slow process, with scanning speeds typically on the order of 5-7 μm/s. Because the measurements require an extended time to complete, the method is sensitive to mechanical vibrations and often requires that the instrument be placed on a vibration isolation support. Therefore, sensitivity to vibrations almost completely precludes use of the white light interferometers in production environments and limits their use to measurement laboratories.

Recently some of the limitations mentioned above were reduced to some degree. It has been shown that the speed of scanning could be increased through the use of different algorithms for data processing that allow sub-sampling of the interference pattern and allow for increasing the sampling interval. This approach permits scanning speed on the order of 30 μm/s, but at an expense of a loss in measurement accuracy. Other recently developed techniques have shown that by precise synchronization of scanning speed and sampling interval it is possible to increase the scanning speed to about 100 μm/s. This method, however, requires more expensive hardware, involves precise calibration of the instrument, and causes a further decrease in measurement accuracy.

Thus, a method that would be capable of further increasing the scanning speed of white light interferometers and/or that would make them less sensitive to vibrations would be very desirable to overcome some of the most limiting characteristics of these instruments.

SUMMARY OF THE INVENTION

The current invention is directed to a white light interferometric system that overcomes the aforesaid and other disadvantages of the prior art. More particularly, the present disclosure combines a white light scanning interferometer, a simultaneous phase-shifting module, and a scanner.

In one aspect, the disclosure provides a white light scanning interferometer that includes a polarization type beam-splitter configured to split light from a short coherence length light source into mutually orthogonally polarized beams, including a reference beam and a test beam. A simultaneous phase-shifting module for receiving the reference and test beams may further be included. The module may be configured to produce at least three independent interferograms, each with different phase shifts between the reference and test beams. A scanner may also be included in the white light scanning interferometer for translating an object under measurement with respect to the interferometer.

The simultaneous phase-shifting module may replace the standard pixelated image detector used in typical white light scanning interferometers, thereby providing three independent, phase-shifted interferograms instead of one. This allows three (or more) interferograms with interference fringes shifted in a controlled fashion (phase-shifted interferograms) to be recorded and collected simultaneously in a very short time. From the set of three simultaneously recorded interferograms, both modulation and phase of the interference fringes can be recovered. These two parameters define a sample point along the envelope of the coherence function. Theoretically, two samples of the coherence function are sufficient to recreate this function and, as a result, location of its maximum is made possible. Thus, the current disclosure enables a reduction of the number of data frames per measurement point and makes the measurement largely insensitive to vibrations.

In another aspect, the disclosure provides a method for measuring surface topography of an object, including the steps of: splitting light from a short coherence length light source into mutually orthogonally polarized beams, including a reference beam and a test beam; recombining the reference beam and test beam, after the reference beam is reflected by a reference surface and the test beam is reflected by the surface undergoing the measurement; and detecting an interference pattern, formed on a simultaneous phase-shifting module (by superposition of the reference beam and the test beam) that includes three or more detectors, by introducing a controlled amount of phase shifting separate for each detector; and calculating a phase value and a contrast value of the interference fringes from the three or more interferograms obtained from the detectors. The method may further include the steps of translating the simultaneous phase-shifting module with respect to an object under measurement, creating a sharp image of the reference surface on the detectors, and/or calculating the location of the visibility peak of the interference fringes for each pixel of the image.

Accordingly, several advantages of the disclosure are to provide increased speed of the measurement by increased scanning speed, increased accuracy by calculating both modulation and phase of the interference fringes and increased resistance to vibrations by enabling very short data collection times. Still further objects and advantages will become apparent from the detailed description and accompanying drawings.

The features, functions and advantages that have been discussed can be achieved independently in various embodiments of the present disclosure or may be combined in yet other embodiments, further details of which can be seen with reference to the following descriptions and drawings.

BRIEF DESCRIPTION OF THE DRAWINGS

Further features and advantages of the invention will be seen from the following detailed description, taken in conjunction with the accompanying drawings, wherein like numerals depict like parts, and wherein.

DETAILED DESCRIPTION OF PREFERRED EMBODIMENT

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Figure 1:
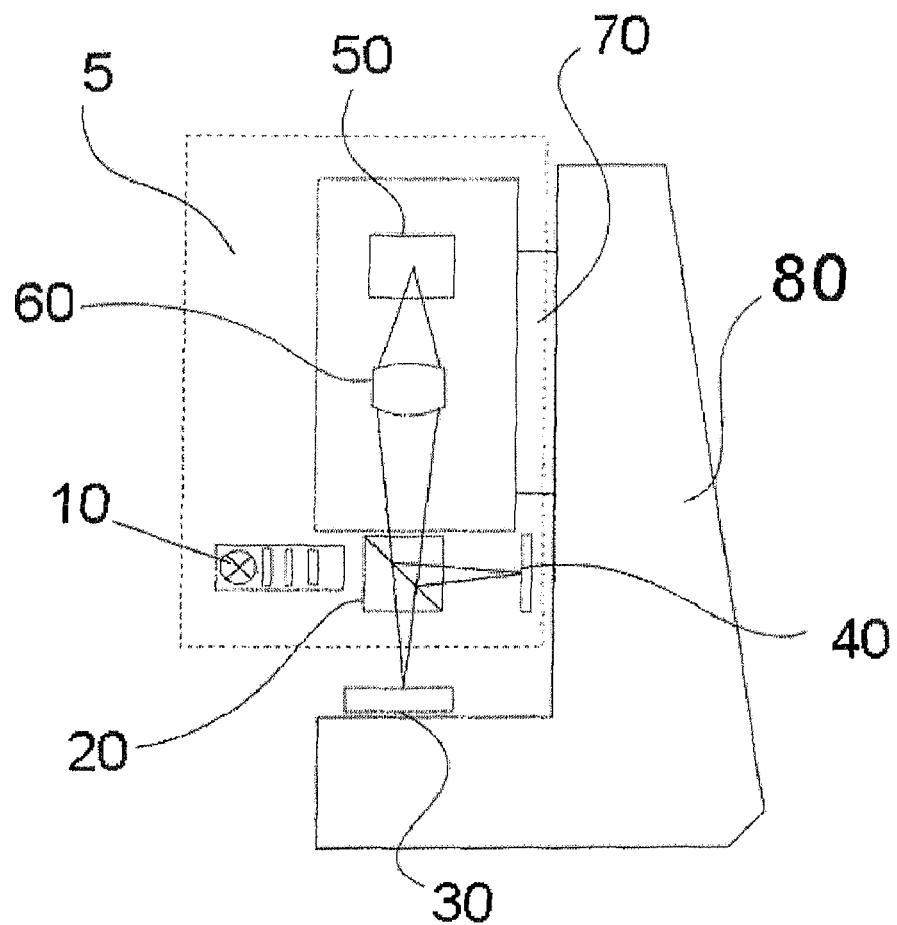
FIG. 1 schematically illustrates a white light scanning interferometer in accordance with the prior art.
Figure 2:
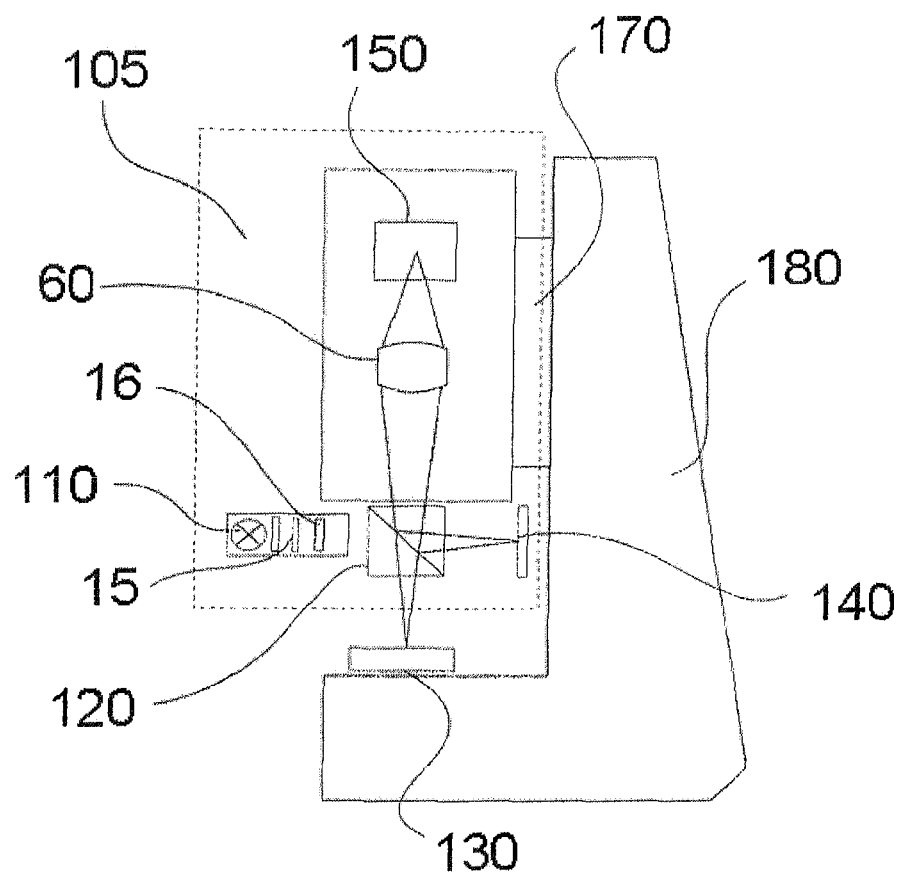
FIG. 2 schematically illustrates a simultaneous phase-shifting white light scanning interferometer in accordance with the present disclosure.

FIG. 2 illustrates a primary example of a simultaneous phase-shifting white light scanning interferometer provided by this disclosure. The interferometer includes the measuring head 105, scanner 170, and base 180. The measuring head 105 includes light source 110 used to illuminate an object 130 under measurement. The measuring head further includes a beam splitter 120 used to produce test and reference beams forming an interferometer system, imaging optics 160, and a simultaneous phase-shifting module 150. In this configuration, the beam splitter 120 is also used to combine light reflected by an object 130 and a reference mirror 140 so that the two combined beams overlap each other and are directed towards simultaneous phase-shifting module 150. The beam splitter may be a polarization type cube beam splitter for a Michelson type interferometer used in systems having a large working distance and low numerical aperture of the imaging lens. For systems with high magnification imaging objectives, a wire grid type polarizer may be used as the beam splitter within a Mirau configuration of the interferometer.

Imaging optics 60 may be used to create the image of the reference mirror on a detector. The simultaneous phase-shifting module 150 may include three or more pixelated detectors (for example, CCD cameras) that are aligned with respect to each other and are placed in the image plane of the imaging optics in such a way that a sharp image of the reference mirror is formed on all the detectors simultaneously. The interference pattern formed by superimposition of the object and the reference beams are preferably created on all the detectors simultaneously, with each of the detectors having known and non-zero phase-shifts between the test and reference beams. Such an image detector arrangement is known as a simultaneous phase-shifting module. For such a module, the test and reference beams are mutually orthogonally polarized. Thus, light source 110 may be linearly polarized by polarizer 15 and the beam splitter 120 may be a polarization type beam splitter.

The light source may be any low coherence light source. In one configuration, the light source is a tungsten halogen bulb used in conjunction with a spectral band filter of a proper width. In an alternative configuration, the light source may include an LED that may further be coupled with an appropriate band-pass filter. Light from the light source passes through the polarizer 15. The polarizer 15 is adjusted at 45° with respect to the polarization axis of the beam-splitter 120, which provides equal intensities of the test and reference beams. Additionally, in order to accommodate different objects having a reflectivity that is substantially different from the reflectivity of the reference mirror 140, an optional half-wave plate 16 may be placed between the polarizer and the beam-splitter to change the intensity ratio of the reference and test beams.

After passing through the polarizer 15 and half-wave plate 16, linearly polarized light from the source 110 is directed towards the polarization type beam splitter 120. In the beam splitter the illuminating light is split into two mutually orthogonally polarized beams. One of these beams is directed to the object being measured (the test beam) and the other beam is directed to the reference mirror (the reference beam). Both beams recombine in the beam splitter and are directed towards the imaging optics 160. The imaging optics 160 forms a sharp image of the reference mirror on the detectors inside the simultaneous phase-shifting module 150.

Figure 3:
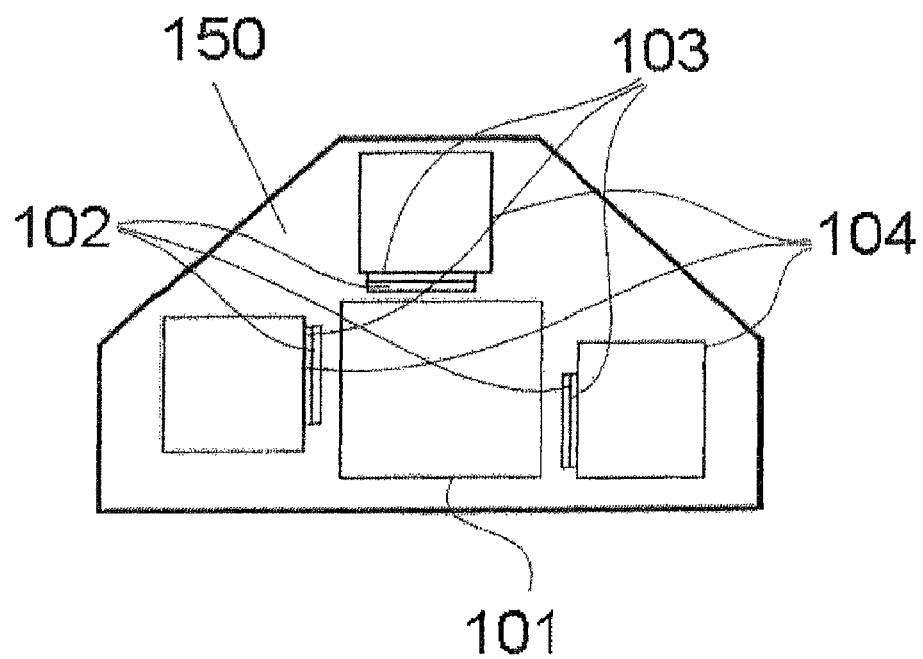
FIG. 3 schematically illustrates a simultaneous phase-shifting module in accordance with the present disclosure.

Referring to FIG. 3, the simultaneous phase-shifting module 150 may include a non-polarizing beam splitter 101 that splits the incoming test and reference beams into at least three channels. The simultaneous phase-shifting module 150 may further include a set of image detectors 104 (one for each channel), a set of quarter-wave plates 102 (one for each channel), and linear polarizers 103 (one for each channel). The quarter-wave plates 102 and linear polarizers 103 are placed in each channel and arranged in such a manner that they introduce different phase shifts between test and reference beams in each channel. The value of phase shift between the test and reference beams may be controlled by adjusting the angles of polarization direction for each polarizer in each channel. The set of image detectors 104 are placed in the imaging plane of the imaging optics to register a set of phase-shifted interferograms. In one configuration, the set of image detectors are pixelated image detectors such as CCD cameras, Referring again to FIG. 2, the optical head 105 may be mounted to the scanner 170. The scanner 170 is attached to the base 180 that includes object 130 and allows for mutual translation of the optical head with respect to the measured object during the measurement. An additional, optional measurement system may be attached to the optical head to monitor the position of the optical head with respect to the base providing an external measurement reference. Such a measurement system may be a distance measuring interferometer.

In operation, the white light scanning interferometer may be used to measure surface topography of the object 130. As previously discussed, light from the source 110 splits into test and reference beams in the beam splitter 120, and these two beams recombine after reflecting from the top surface of the object 130 and reference mirror 140, respectively. The imaging optics 160 creates a sharp image of the reference mirror on the image detectors 104. Initially, the object may be brought to a sharp focus by a coarse focusing mechanism of the microscope. Before scanning, the object should be translated along the scanning direction by a distance greater than the maximum depth of the object's surface profile. From this position, the object is scanned through the full range of the object's surface profile. Scanning is performed in steps that are related to the coherence length of the light source. For each scanning step, three or more interferograms are collected and stored in a computer. After the scan is completed, the sequence of stored images may be processed and location of a peak of visibility of the interference fringes may be calculated for each pixel of the image. Location of the visibility peak can be calculated with very high accuracy and, as a result, sensitivity of the measurement is usually better then 1 nm. Typically, a short coherence length of the illumination source is employed (usually several micrometers), but it may be adjusted by properly choosing a spectral-band filter in front of the source.

Further, the position of the optical head with respect to the scanner may be controlled by a position detector. The position detector monitors the location of the scanner and provides information about the location at which images of the object are collected during the scan. Because images of the object can be captured very quickly and because position of the scanner can be monitored with high accuracy during the scan, the system is substantially insensitive to vibrations. Also, by proper choice of the coherence length of the source and image acquisition frequency, the scanner speed may be controlled. As such, scanning speed is no longer closely tied and confined to the wavelength of light, and the scanning speeds can therefore be significantly increased as compared to existing designs. Moreover, because the present simultaneous phase-shifting white light scanning interferometer simultaneously collects three or more interferograms, it can also perform phase calculation for all the points of the object for which the interference pattern exists. Thus, this instrument, apart from a scanning mode, could also be used as a standard phase measuring interferometer for smooth objects for which phase unwrapping can be successfully implemented.

Various changes may be made in the invention without departing from the spirit and the scope thereof. It should be emphasized that the above-described embodiments of the present simultaneous phase-shifting white light scanning interferometer are merely possible examples of implementations and are merely set forth for a clear understanding of the principles of the invention. Many different embodiments of the simultaneous phase-shifting white light scanning interferometer described herein may be designed and/or fabricated without departing from the spirit and scope of the invention. All these and other such modifications and variations are intended to be included herein within the scope of this disclosure and protected by the following claims. Therefore the scope of the invention is not intended to be limited except as indicated in the appended claims.

What is claimed is:

1. A method for measuring surface topography of an object, said method comprising the steps of:
    splitting light from a short coherence length light source into mutually orthogonally polarized beams, including a reference beam and a test beam;
    recombining said reference beam and test beam, after the reference beam is reflected by a reference surface and the test beam is reflected by the surface undergoing the measurement; and
    detecting an interference pattern, formed on a simultaneous phase-shifting module that includes three or more detectors to introduce controlled amount of phase shifting separate for each detector; and
    calculating a phase value and a contrast value of the interference fringes from the three or more interferograms obtained from the detectors.

2. The method of claim 1, further comprising the step of translating an object under measurement with respect to the interferometer.

3. The method of claim 1, further comprising the step of creating a sharp image of the reference surface on the detectors.

4. The method of claim 1, further comprising the step of calculating a location of the visibility peak of the interference fringes for each pixel of the image.

5. The method of claim 1, wherein the step of detecting an interference pattern comprises supervision of the reference beam and the test beam.

\* \* \* \* \*